(12) United States Patent
Leeb (10) Patent No.: US 10,238,098 B2
(45) Date of Patent: Mar. 26, 2019

(54) AGRICULTURAL DISTRIBUTION MACHINE HAVING A SYSTEM FOR THE AUTOMATIC SWITCHING OF SPRAY PROFILES

(71) Applicant: HORSCH LEEB Application Systems GmbH, Oberpöring (DE)

(72) Inventor: Theodor Leeb, Wallersdorf (DE)

(73) Assignee: HORSCG LEEB Application Systems GmbH, Oberp¿ring (DE)

( * ) Notice: Subject to any disclaimer, the term of this patent is extended or adjusted under 35 U.S.C. 154(b) by 63 days.

(21) Appl. No.: 15/505,222

(22) PCT Filed: Aug. 25, 2015

(86) PCT No.: PCT/EP2015/069437
§ 371 (c)(1),
(2) Date: Feb. 20, 2017

(87) PCT Pub. No.: WO2016/030368
PCT Pub. Date: Mar. 3, 2016

(65) Prior Publication Data
US 2017/0251657 A1   Sep. 7, 2017

(30) Foreign Application Priority Data
Aug. 29, 2014  (DE) .......................... 10 2014 112 441

(51) Int. Cl.
*A01M 7/00*   (2006.01)
*A01C 21/00*  (2006.01)
(Continued)

(52) U.S. Cl.
CPC ......... *A01M 7/0089* (2013.01); *A01C 21/005* (2013.01); *A01C 23/007* (2013.01); *A01C 23/047* (2013.01)

(58) Field of Classification Search
CPC .. A01M 7/0089; A01C 21/005; A01C 23/007; A01C 23/047
See application file for complete search history.

(56) References Cited

U.S. PATENT DOCUMENTS 6,193,166 B1    2/2001  Miller et al.
6,726,120 B2 *  4/2004  Schaffter .............. A01B 79/005
                                                    239/159
(Continued)

FOREIGN PATENT DOCUMENTS

DE          69808889 T2      8/2003
DE       102011053420 A1     3/2013
(Continued)

OTHER PUBLICATIONS

William Strunk Jr., and E.B. White, The Elements of Style, 3rd Edition, 1975, all pages. (Year: 1975).*
(Continued)

*Primary Examiner* — Calvin Cheung
(74) *Attorney, Agent, or Firm* — Erickson Kernell IP, LLC; Kent R. Erickson (57) ABSTRACT

An agricultural distribution machine for spreading liquid and/or solid plant protection products by means of a distribution apparatus which is height-adjustably arranged on a frame of the distribution machine having a plurality of nozzle holders with spray nozzles mounted thereon arranged spaced apart from each other for the purpose of distributing the plant protection product to be spread. Activation of the distribution apparatus is carried out based on at 10 least two spray profiles stored in a computer unit, each spray profile composed of a plurality of parameters. In order to achieve a consistent distribution quality of the plant protection product, different spray profiles can be stored in a computer unit and, in the instance of a deviation of the parameters of a spray profile, an automated activation of the distribution
(Continued)

machine or of the distribution 15 apparatus to the parameters of a second spray profile is carried out.

24 Claims, 3 Drawing Sheets

(51) Int. Cl.
*A01C 23/00* (2006.01)
*A01C 23/04* (2006.01)

(56) References Cited

U.S. PATENT DOCUMENTS

| | | | |
|---|---|---|---|
| 8,028,927 B2 * | 10/2011 | Ward | A01M 7/0089 |
| | | | 239/1 |
| 2010/0032492 A1 * | 2/2010 | Grimm | A01M 7/0089 |
| | | | 239/1 |
| 2012/0215410 A1 * | 8/2012 | McClure | A01B 79/005 |
| | | | 701/50 |
| 2013/0277442 A1 * | 10/2013 | Ballu | A01M 7/0057 |
| | | | 239/1 |

FOREIGN PATENT DOCUMENTS

| | | |
|---|---|---|
| DE | 102012101013 A1 | 8/2013 |
| EP | 2022329 A2 | 2/2009 |
| EP | 2898773 A1 | 7/2015 |
| WO | 9712688 A1 | 4/1997 |

OTHER PUBLICATIONS

International Search Report dated Dec. 16, 2016 for International application No. PCT/EP2015/069437.

* cited by examiner

Fig. 1

Fig. 2

AGRICULTURAL DISTRIBUTION MACHINE HAVING A SYSTEM FOR THE AUTOMATIC SWITCHING OF SPRAY PROFILES

CROSS-REFERENCE TO RELATED APPLICATIONS

This application claims priority from German Patent Application No. 102014112441.3, filed Aug. 29, 2014, the disclosure of which is hereby incorporated herein in its entirety by reference.

BACKGROUND OF THE INVENTION

The present invention relates to an agricultural distribution machine with a system for its automated activation based on spray profiles, the agricultural distribution machine having the features as described and claimed herein. The invention further relates to a method for spreading liquid and/or solid plant protection products by means of a distribution apparatus, the method having the features as described and claimed herein.

Agricultural distribution machines or field sprayers, are used for spreading or for applying liquid and/or solid plant protection products and/or fertilizers. Such field sprayers having a distribution apparatus that is oriented transversely to the driving direction and moved across a plant growth, the distribution apparatus normally formed by a spray boom, are known in different embodiment variants, such as a self-propelled field sprayer or a field sprayer that is towed by means of or hitched onto a towing vehicle.

The aim of all of these field sprayers is to spread a defined fluid volume of plant protection products, for example in the form of pesticides or fertilizers, evenly and with a definable intensity onto a plant growth, where the process of distributing the fluid volume is to be carried out preferably depending on the respective plant protection product to be spread. Various possibilities for achieving a distribution that is as even as possible are known in the prior art.

Arranged on the spray boom of the distribution apparatus are nozzle holders that are located spaced apart from each other. Mounted on these nozzle holders, in turn, is at least one spray nozzle, generally, however, a plurality of spray nozzles. For producing the desired distribution of the plant protection products, the spray nozzles each generate a spray cone directed toward the ground or toward the plant growth. Depending on the number and the type of the specifically activated spray nozzles, different nozzle profiles can thus be configured.

A nozzle holder, which is associated with several spray nozzles with different characteristics, is known in the art, for example, as shown in DE 10 2011 053 420 A1. Different spray nozzles can be activated or different nozzle profiles can be produced according to the desired drop spectrum or spreading spectrum.

Besides the definition of nozzle profiles with different nozzle pitches, further parameters exist in known distribution apparatuses for varying the spray cones or for achieving the desired distribution precision of the plant protection products. One variation, for example, consists in changing the height control, that is to say, in changing the distance between the plant growth or the ground surface and the distribution apparatus, and this can have a positive or negative effect in particular on the drift. A further variation consists in using different spray pressures, i.e., the spray pressure at which the plant protection product is spread over the growth. This spray pressure depends on the driving speed and on the spreading quantity, among other things.

In order to achieve the desired or required distribution for the specific plant protection product to be spread, the variations or the parameters between nozzle profile, height control, and spray pressure each have to be adjusted with respect to each other.

For this purpose, a system is already known from the prior art, in which the activation of different spray nozzles is carried out in an automated manner, based on the spray pressure currently existing at the distribution apparatus. However, in the known systems it is not possible for the user or for the operator to define which spray nozzle combinations are to be activated. Also, there is no system known in the prior art in which an automated adaptation of the height control is carried out in addition to an automated activation of different spray nozzle combinations. Up to now, the height control had to be manually adapted in each case. In particular, however, with frequent changes of the driving speed or of the spreading quantity such a system is not convenient or is too sluggish and it is thus not possible to control the distribution apparatus based on GPS data, for example. In particular in precision farming, this manual activation has proven unsuitable for practice, as frequent and quick switchovers between the spray profiles at an adapted distribution precision are desired.

BRIEF SUMMARY OF THE INVENTION

The present invention is therefore based on the task of providing a system in which different spray profiles can be stored in a computer unit such that these spray profiles can include as parameters a nozzle profile, an associated spray pressure, and an associated height control, for example, and such that the system in the instance of a deviation of a parameter of a spray profile can carry out an automated activation of the distribution apparatus based on another spray profile, by means of which the required distribution precision can be likewise achieved.

This task of the present invention is achieved with the invention as claimed herein as well as with a method as claimed herein. Features of advantageous further developments of the invention are indicated in the respective claims.

In a first exemplary embodiment, the invention provides an agricultural distribution machine, preferably in the form of a field sprayer, which can be designed as a self-propelled machine or as a machine that is mounted or hitched to a towing vehicle. Such field sprayers are used for spreading plant protection products, for example in the form of pesticides or fertilizers. The field sprayer essentially comprises a frame for carrying the individual assemblies, a storage vessel for carrying along the plant protection product to be spread, a computer unit for controlling the individual machine elements and their parameters, as well as a distribution apparatus or a spray boom extending transversely to the driving direction and being height-adjustable in relation to the frame by means of adjustment elements.

A plurality of nozzle holders are arranged regularly or irregularly spaced apart (for example, approximately 25 cm and/or 50 cm) from each other on the distribution apparatus, and mounted on each of these nozzle holders is at least one spray nozzle, generally, however, a plurality of spray nozzles. By means of these spray nozzles, the plant protection product is distributed on the plant growth or on the area to be treated, corresponding as closely as possible to the required distribution precision. For this purpose, the spray nozzles produce a spray cone, which is directed toward the plant growth.

Depending on the specific plant protection product to be spread, different nozzle profiles can be selected in the computer unit or they can be specified by an operator, for example. That is to say that it is in each case possible to define different combinations of spray nozzles for the respective nozzle holders. It is also possible to combine spray nozzles that are differently spaced apart, with these spaces preferably being 25 cm or 50 cm. Quadruple nozzle holders and/or double nozzle holders are frequently used in this context, where four different spray nozzles with different characteristics each are generally present at a quadruple nozzle holder and in each case two different spray nozzles with different characteristics each at a double nozzle holder. Individual spray nozzles of the quadruple nozzle holder and of the double nozzle holder can also be switched together or combined. The nozzles are generally numbered as 1+2+3+4 (e.g., for the quadruple nozzle holder) and 5+6 (e.g. for the double nozzle holder), so that one nozzle combination could be 3+6, for example. The spray nozzles are then in turn selected based on the specifically required spray quality (fine, medium, or coarse droplet size). Furthermore, the beam angles or the opening angles of the individual spray cones are influenced by a corresponding selection of the spray nozzles. In addition, the number of overlaps of the spray cones of adjacent nozzle holders to each other can be varied by way of the spaces between the individual spray nozzles, such that there is no overlap or a double or a multiple overlap of the spray cones to each other.

A spray pressure range and/or a working height or a height control is moreover defined for each nozzle profile such that in each case different spray profiles result from these at least two, preferably three parameters. The specific parameters currently existing at the distribution apparatus are monitored or measured by means of sensors. In the instance of exceeding or falling below the spray pressure range, for example, an automated adaptation or an automated activation of the distribution machine and/or of the distribution apparatus to another spray profile is carried out, and for this purpose at least two different spray profiles can in turn be selected prior to the start of the plant protection process.

The desired spray profiles can be input into the computer unit of the distribution machine by means of a terminal or of another input device. It is likewise conceivable that an input of the spray profiles is carried out based on characteristic diagrams or by means of a database from a producer of plant protection products, for example. Other possibilities for input are also conceivable. Control signals are then generated by the input, which control signals, by being processed in the computer unit, can specify which spray profile or which distribution precision is required for the specific plant protection product in order to achieve a wetting that is appropriate for the plant protection product.

The height control can be variably adjusted with an adjustment element, which is arranged between the frame of the carrier vehicle and the distribution apparatus. Diverse actuators can be used as adjustment elements. Preferably, hydraulically operating cylinders can be used for this purpose. Pneumatic, electric, or other actuators are, however, also employable. The measurement of the space between the distribution apparatus and the plant growth can be carried out, for example, by means of ultrasonic sensors mounted on the distribution apparatus, or by means of various other distance sensors. The height control moreover has a great influence on the drift of the plant protection product, generally in such a manner that the drift is smaller the closer the distribution apparatus is guided above the plant growth. A space range of the height control is typically approximately between 25 cm and 50 cm.

By way of the spray pressure, a pressure range in the supply system of the distribution apparatus is defined with which pressure the supply systems or the spray nozzles are charged. The pressure range can be two to five bar, for example. During the spreading process, the pressure range is influenced by various factors, for example by the spreading quantity of the plant protection product, which quantity in turn depends on the driving speed of the distribution apparatus. This means that it is necessary to change the spreading quantity of the plant protection product when the driving speed is changed, and this in turn can lead to a change of the spray pressure.

An automated activation of the distribution apparatus could be carried out according to the present invention in the manner described as follows. First, different nozzle profiles are stored in a computer unit, that is to say, it is defined whether, for example, one or more spray nozzles that are spaced apart, for example, 25 cm or 50 cm, are activated together. Many different combinations are conceivable in this context. It should be noted that it is not imperatively necessary to activate a plurality of nozzles. It is also conceivable to use only one spray nozzle in each case, which is spaced apart, for example, 50 cm.

Each nozzle profile is associated with a pressure range and/or with a height control of the distribution apparatus, that is to say, it is defined with which spray pressure each of the nozzle profiles may be charged, and at which distance or at which height above the plant growth or above the ground surface the distribution apparatus is to be guided. These preferably three parameters together result in a spray profile, and a multitude of such spray profiles with many different parameters can be stored in the computer unit. In the beginning of the spreading process, for example, an operator or a vehicle driver can select from the multitude of spray profiles those by way of which can be achieved the wetting or distribution precision that is required for the specific plant protection product to be spread. It is, however, also conceivable that an automatic preselection of the spray profiles is carried out by the computer unit by inputting the plant protection product to be spread into the computer unit, for example. The spreading process is subsequently carried out, and for this purpose a first spray profile with its associated nozzle profile as well as its associated spray pressure and/or its associated height control is selected or the distribution apparatus is correspondingly activated.

If, for example, the driving speed or the spreading quantity are increased or reduced, thereby possibly exceeding or falling below the specified spray pressure, respectively, this can imply that the desired distribution precision can possibly be no longer achieved and a different spray profile would be necessary in order to achieve the previously intended distribution precision again. In this case, the computer unit carries out an automated activation of another, normally previously selected spray profile by way of which the desired distribution precision can again be achieved, for which spray profile, however, the parameters are defined differently. This means that another nozzle profile and/or another height control is activated in the distribution apparatus such that the desired wetting is achieved by way of a greater or smaller spray pressure or by way of a greater driving speed or by way of a greater spreading quantity.

In order to determine the parameters existing at the distribution apparatus during the spreading process, various sensors or measuring means are located at the distribution apparatus or at the field sprayer. Among other things, the height control, the spray pressure, the driving speed, and/or the spreading quantity can be determined by way of these sensors or measuring means. In an actual-target value comparison, these values are subsequently compared to those parameters stored in the computer unit that are required for the specific spray profile. If there are any corresponding deviations, the distribution apparatus is then in turn rerouted according to the invention to another spray profile.

In a preferred embodiment, the switching intensities or the switching points of the spray profiles can likewise be stored along in a computer unit. This can be carried out by means of a parameterizable hysteresis, for example. The switching behavior can likewise be defined such that neither a strong under- nor overdosing between the spray profiles can occur during the activation of the distribution apparatus at the time of switchover (opening the "new" nozzles at a parameterizable moment before closing the "old" ones). Likewise, a strategy can be stored in order to limit regulation-induced pressure fluctuations and thus volume fluctuations during the switching point. This is preferably carried out by a brief "freezing" of the regulation and a switching to the calculated points.

The method according to the invention thus enables a quick and variable automated adaptation of the respective spray profiles. This is particularly advantageous if the spreading of the plant protection products is carried out based on "precision farming". The term "precision farming" in this context means a cultivation of agricultural fields under consideration of small-scale heterogeneities, for example, in the form of a greater density of weeds or of pests in certain sections. By using the appropriate information technology and device control technology (GPS; GIS; on-board and spraying computers; application software; image analysis; sensors; etc.), it is possible to localize these weed densities or pest densities and to specifically adapt, for example, the spreading quantity of the plant protection products. This adaptation can in turn possibly necessitate a different spray profile for achieving the desired distribution precision. This is where the present invention is in turn put to use, thus making it in turn possible to automatically adapt the spray profiles or their parameters.

The parameters specifically adjusted by the spray profiles are preferably displayed or indicated in a terminal such that a machine operator can determine whether the selected spray profiles correspond to the desired area of operations or to the required distribution quality. If required, the operator can thus also select or define further or other spray profiles.

In a preferred embodiment, the spray profiles or their parameters can also be selected such that they can vary across the working width of the distribution apparatus. This is particularly important when driving along curves, among other things, for example when the spray nozzles located on the outside of the curved path are to have a higher spreading quantity of plant protection products than the spray nozzles located on the inside of the curved path. It is hereby possible that the spray nozzles located on the inside require a lower spray pressure than those located on the outside, which then leads to that specific spray profile being selected for which these parameters in turn conform to the greatest possible extent to the target parameter. It is also conceivable in this context that a different nozzle combination is used, for example, in the area located outside than that used inside, which would then also make it possible to adapt the spreading quantity, for example. Generally, the parameters can again be varied in many different ways in this context.

According to a further development of the invention, the parameters of the spray profiles can be adapted when driving along curves based on values determined by a speed sensor or also by a plurality of speed sensors, where the speed sensor or the plurality of speed sensors can be associated with the distribution apparatus, optionally, however, also with a towing vehicle.

Preferably, two speed sensors are used, which are in each case provided at the side wings of the distribution apparatus or of the spray boom. The speed of the distribution apparatus or of the spray boom can be determined by means of the at least one speed sensor or by means of the plurality of speed sensors. The spreading quantity of the plant protection product or the spray pressure of the spray nozzles can be correspondingly adapted based on the measured speed. At the same time, a corresponding profile of spray nozzles, which profile is stored in the computer unit, can be defined or selected, as the case may be. In order to regulate the spreading quantity or the spray pressures of the spray nozzles, the measured speed values are transmitted to a computer unit, which analyzes and evaluates the determined values. The detection for driving along curves has proved advantageous in practice, as it is thus possible to adapt the spreading quantity of the plant protection product to the movement profile of the distribution machine. An even spreading of the plant protection products can now also be ensured when driving along curves.

It can also be provided that the parameters of the spray profiles can be adapted when driving along curves based on values determined by a gyroscope or also by a plurality of gyroscopes, where the gyroscope or the plurality of gyroscopes are associated with the distribution apparatus or with the carrier vehicle.

In a preferred embodiment, one gyroscope is associated with the distribution apparatus or with the carrier vehicle. The gyroscope can detect the centrifugal forces, which occur when driving along curves and which in particular act upon the distribution apparatus, that is to say that in the present embodiment, the gyroscope in each case measures the acceleration of the distribution apparatus in Z direction. When driving along curves, the distribution apparatus generally tilts inward such that the plant protection product is unevenly sprayed. This disadvantage could be remedied by arranging a gyroscope at the carrier vehicle or at the distribution apparatus. By means of the gyroscope it is possible to distinguish whether the carrier vehicle with the towed distribution apparatus is driving straight ahead or along curves. In the instance of driving along curves, the gyroscope detects the movement and the tilt of the spray boom and forwards the determined values to a computer unit. The computer unit ensures that the spreading quantity or the spray pressures in the spray nozzles are correspondingly adapted to driving along curves. If necessary, control variables can be generated at the same time, which hold the spray boom in a position that is steady and aligned parallel to the ground surface.

A further possibility for detecting a drive along curves consists in calculating the curve radius of the vehicle by means of the gyroscope.

This allows drawing conclusions on the applied steering angle of the vehicle and on the intensity and direction of the curve as well as on the further curve progression. In this embodiment, the detection of the drive along curves is based on detecting the acceleration of the spraying vehicle or of the spray boom, as the case may be. The spray pressures of the spray nozzles are adapted to the driving movement of the spraying vehicle based on the detected values and according to the curve radius.

In order to fulfill the above-mentioned object, the present invention additionally proposes a method for spreading liquid and/or solid plant protection products by means of a distribution apparatus, which is height-adjustably arranged on a frame of a distribution machine and equipped with a plurality of nozzle holders, which are in each case spaced apart from each other, each of which nozzle holders in each case has at least one spray nozzle for distributing the plant protection product to be spread. The activation of the distribution apparatus or the distribution of the plant protection products, is carried out based on at least two spray profiles that are stored in a computer unit, which spray profiles each comprise or each take into account at least two parameters and/or sensor values. In the instance of a deviation of at least one parameter or of one sensor value of a first spray profile, a switching to the second spray profile, that is to say, an automated activation of the distribution apparatus, is carried out according to the invention based on the parameters of the at least one second spray profile. Such a spray profile can be composed of at least a nozzle profile and/or an associated pressure range and/or an associated height control for the spray boom or for the distribution apparatus. The at least two spray profiles can, in particular be selected or configured in such a manner that largely the same distribution quality can be achieved in each case with these spray profiles even if based on different parameters in each case.

A nozzle profile can be composed of variable activation parameters of spray nozzles with different characteristics and/or of the activation of spray nozzles that are differently spaced apart from each other, for example. The spray profile is expediently stored in the computer unit such that the computer unit can determine which spray profile is currently being used at the distribution apparatus based on the difference between an actual pressure range and a target pressure range. In addition, the computer unit can thereby carry out an automated activation to another spray profile and its nozzle profile and/or its height control in such a manner that the actual pressure range approximately corresponds to the target pressure range. The pressure range can, in particular, be influenced by the driving speed and/or by the desired or by the intended spreading quantity of the plant protection product.

The method according to the invention can furthermore provide that the computer unit carries out an automated activation of the distribution apparatus to at least one of the at least two existing spray profiles such that the parameters come closest to the parameters actually existing at the distribution apparatus or to the sensor values and such that the desired distribution quality is achieved or at least approximately achieved by means of these parameters, where an actual-target value comparison can preferably be carried out for this purpose in the computer unit. In order to obtain the desired control parameters and operating parameters for the computer unit, sensors are located in each case at the distribution apparatus and/or at the distribution machine, which sensors serve for detecting the actual values of the parameters. The actual values of the existing parameters can thus be compared to the target values of the parameters of the selected spray profile by means of the computer unit. A different spray profile is selected in each case by determining a deviation of the parameters of the selected spray profile by means of the computer unit, with the parameters of this spray profile also being automatically adapted.

Besides numerous other specified values, the switching intensities between the parameters of the spray profiles are also stored in the computer unit. The spray profiles can be activated and/or varied based on small-scale heterogeneities, for example, which are determined by means of information technology and device control technology. Additionally, a strategy is stored in the computer unit, which strategy limits regulation-induced pressure fluctuations and/or volume fluctuations during the switching point between the spray profiles. It can moreover be useful to have the parameters of the spray profiles be defined by an operator and/or accessed from a database. A further useful option can be to define the spray profiles such that their parameters can vary across the working width of the distribution apparatus.

According to a further useful embodiment variant, the method can provide the parameters of the spray profiles to be adapted when driving along curves based on values determined by one or more speed sensors. This speed sensor or the plurality of speed sensors can optionally be associated with the distribution apparatus and/or with its distribution boom. It can moreover be useful to adapt the parameters of the spray profiles when driving along curves based on values determined by a gyroscope or by a plurality of gyroscopes, where the gyroscope or the gyroscopes are associated with the distribution apparatus or with its distribution boom and/or with a towing vehicle.

It should be noted that the selected spray profiles or the applied spray profiles can be used to achieve largely the same distribution quality by using different parameters, that is to say that in the instance of a deviation of one of the parameters, the spray profiles are activated such that the distribution apparatus is rerouted to the parameters of another spray profile such that the distribution quality remains consistent, at least to the greatest possible extent.

It should finally be mentioned that a deviation of a parameter of the spray profile only leads to activating another spray profile if the parameters of that spray profile correspond to the actually existing parameters and if the desired distribution quality is also achieved by way of those parameters. That means that in each case that specific spray profile is selected for which the parameters come closest to the current values existing at the distribution apparatus and for which the distribution quality conforms to the desired distribution quality, at least to the greatest possible extent.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIG. 1 shows a schematic lateral view of an embodiment variant of a self-propelled agricultural machine or of a distribution machine with a distribution apparatus arranged thereon.

FIG. 2 shows the regulation or the components of the control of the distribution apparatus, in a schematic block diagram.

FIG. 3 shows a top view of an exemplary embodiment of a section of the distribution apparatus with nozzle holders or with spray nozzles arranged thereon.

DETAILED DESCRIPTION

Figure 1:
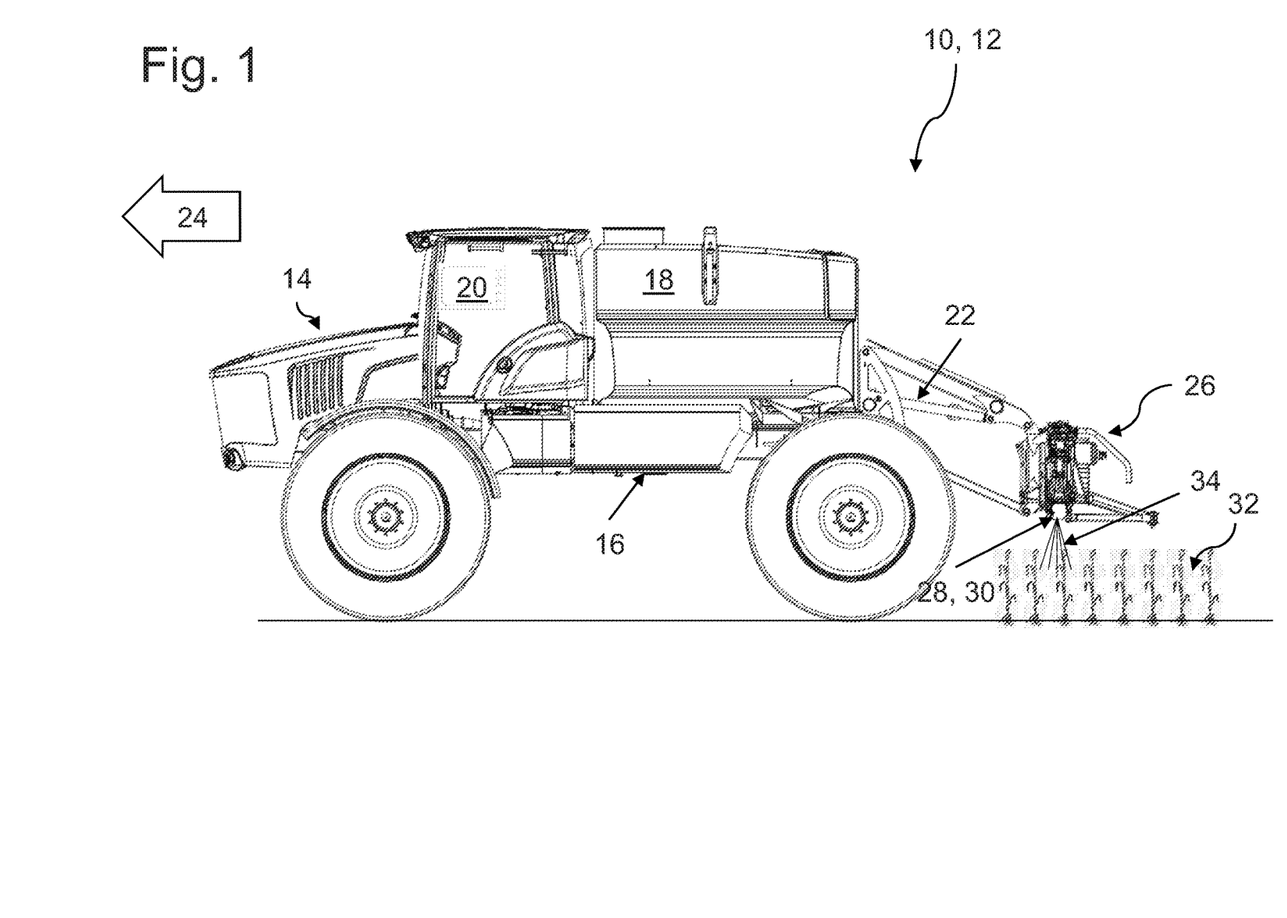
Figure 2:
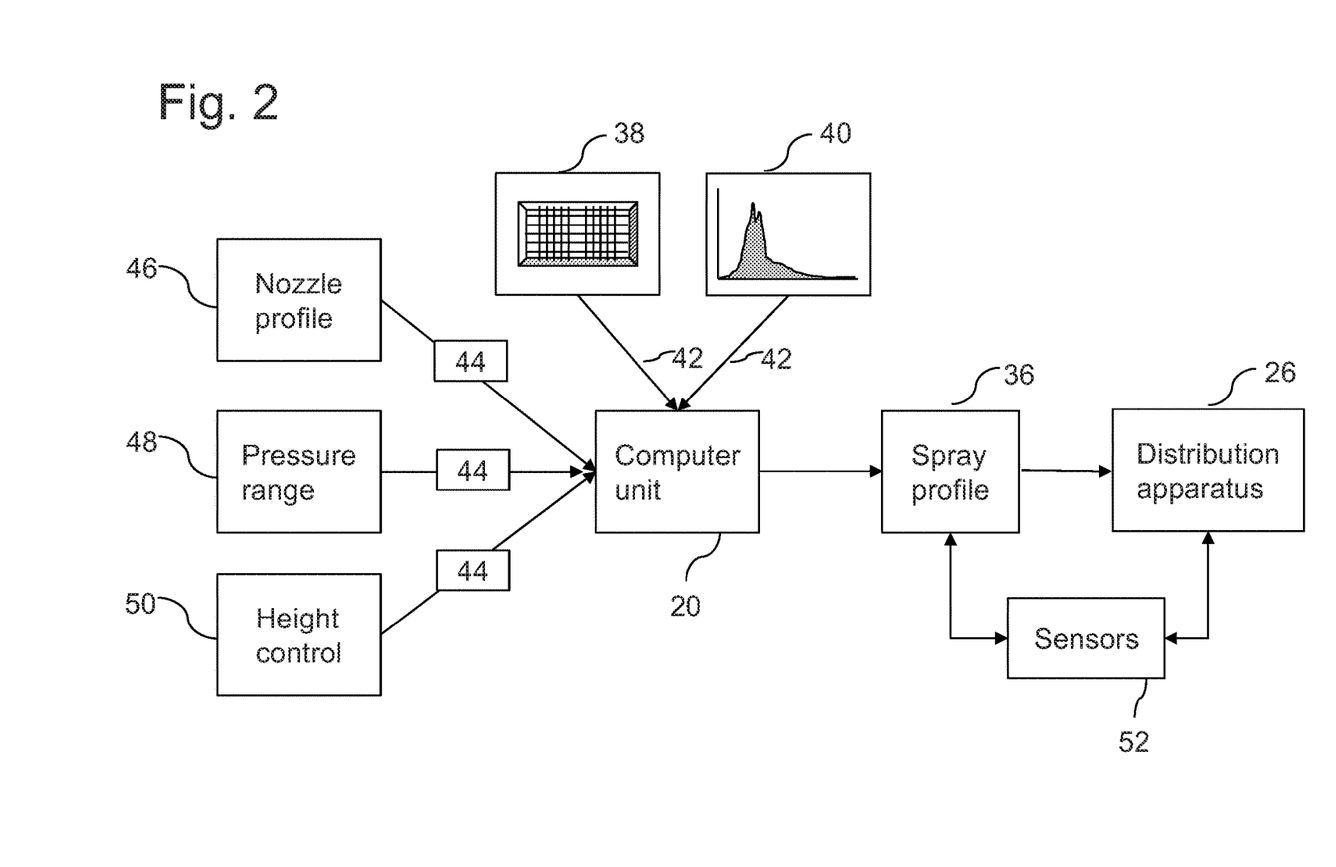
Figure 3:
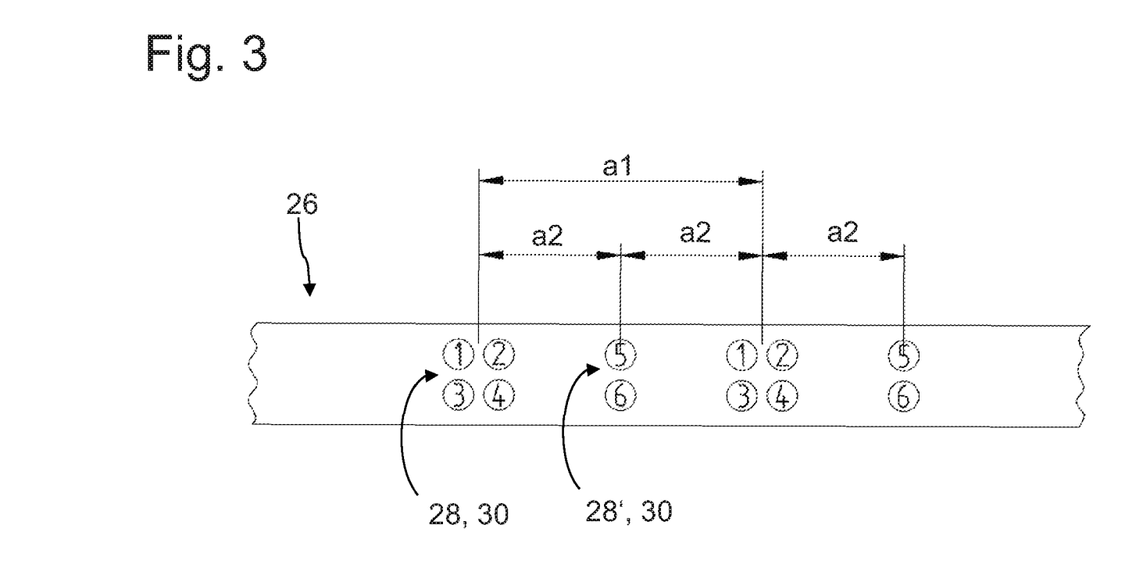

The same or equivalent elements of the invention are designated by identical reference characters in the FIGS. 1 to 3. Furthermore and for the sake of clarity, only the reference characters relevant for describing the respective figure are provided. It should be understood that the detailed description and specific examples of the distribution machine according to the invention are intended for purposes of illustration only and are not intended to limit the scope of the invention.

The schematic lateral view of FIG. 1 shows an embodiment variant of a self-propelled agricultural distribution machine 10, which can also be referred to as a field sprayer 12, for spreading liquid plant protection products and/or fertilizers. The field sprayer 12 is designed as a self-propelled machine. According to FIG. 1, the field sprayer 12 comprises a carrier vehicle 14 with an own drive and a frame 16 for carrying the individual assemblies, a storage vessel 18 for carrying along the plant protection product to be spread, a computer unit 20 for controlling the individual machine elements and their parameters, as well as a distribution apparatus or a spray boom 26 extending transversely to the driving direction 24 and being height-adjustable in relation to the frame 16 by means of adjustment elements 22 arranged at the rear end of the carrier vehicle 14. Spaced apart by twenty-five centimeters or by fifty centimeters, for example, a plurality of nozzle holders 28 are mounted to the distribution machine 10 or to its distribution apparatus 26, as the case may be. Mounted at these nozzle holders, in turn, is/are at least one spray nozzle 30 in each case, however, as a rule, a plurality of spray nozzles 30, for evenly distributing the plant protection liquid and/or the fertilizing liquid. For this purpose, the spray nozzles 30 produce a spray cone 34, which is directed toward the plant growth 32.

Furthermore, two speed sensors (not illustrated here) are associated with the distribution machine 10 or with the spray boom 26, as the case may be. The speed sensors are preferably provided in each case at the side wings of the distribution machine 10 or of the spray boom 26, as the case may be. A gyroscope (not illustrated here) can also be associated with the carrier vehicle 14 or with the distribution machine 10 or with the spray boom 26, as the case may be. The speed sensors and/or the gyroscopes serve for identifying a drive along curves such that the spreading quantity or the spray pressures 48 of the spray nozzles 30 are regulated according to the driving movement of the carrier vehicle 14.

In this context, the speed sensors in each case measure the occurring speeds of the distribution apparatus 26 when driving along curves and transmit the values to a computer unit. The computer unit analyzes the transmitted values and controls the spreading quantity of the plant protection product or controls the spray pressures 48 of the spray nozzles 30, as the case may be. Based thereupon, a corresponding spray profile, which is stored in the computer unit (as seen in FIG. 2), can be called up in each case.

In a further embodiment, on the other hand, in which a gyroscope is provided, the acceleration of the distribution apparatus 26 or of the carrier vehicle 14 is detected. In this embodiment, the centrifugal forces can be detected, which occur when driving along curves and which in particular act upon the distribution apparatus 26. Here, the gyroscope in each case measures the acceleration of the distribution apparatus 26 in Z direction or in the direction of a vertical axis, as the case may be.

By means of the gyroscope, it is alternatively possible to draw conclusions on the applied steering angle of the carrier vehicle 14 and on the intensity and direction of the curve as well as on the further curve progression. The gyroscope here serves to calculate the curve radius of the carrier vehicle 14. The spray pressures 48 of the spray nozzles 30 are adapted to the driving movement of the carrier vehicle 14 based on the detected values and according to the curve radius.

In the mentioned variants for detecting a drive along curves, the measured values are transmitted to a computer unit. The computer unit subsequently ensures that the spreading quantity or the spray pressures 48 in the spray nozzles 30 are correspondingly adapted to driving along curves. If necessary, control variables can be generated at the same time, which hold the distribution apparatus 26 in its position aligned parallel to the ground surface.

The block diagram of FIG. 2 shows the regulation or the components of the control of the distribution apparatus 26, as well as the input of the respective spray profiles 36 for spreading the plant protection product. The spray profiles 36 are stored in a computer unit 20. This can be carried out, for example, by inputting by means of a terminal 38 or also by reading in characteristic diagrams 40 or data from a database or also by a combination of reading in and inputting. Control signals 42 can be generated by means of the terminal 38 or by means of the characteristic diagrams 40, which control signals, by being processed in the computer unit 20, specify which spray profiles 36 are required.

The spray profile 36 is defined by or depends on a plurality of parameters 44 which parameters 44 can be processed or varied at the distribution apparatus 26 and/or at the distribution machine 10 by means of the computer unit 20.

To begin with, a first parameter provides different nozzle profiles 46 or a defined activation of the spray nozzles 30 or of the nozzle holders 28, as the case may be. It is thus possible for an operator, for example, to define in each case different profiles of spray nozzles 30, in which profiles the spaces between individual nozzles can vary, with these spaces preferably being twenty-five centimeters and/or fifty centimeters. This is influenced by the type of spray nozzle, among other things. The spray nozzle type is preferably selected based on the respective required spray quality (fine, medium, or coarse droplet size). Among other things, the angles of the individual spray cones 34 are also influenced.

A further parameter defines a pressure range 48 or a spray pressure 48 in the supply system of the distribution apparatus 26, that is to say, it is defined with which pressure the supply systems or the spray nozzles 30 are charged. This pressure range 48 can be two to five bar, for example. During the spreading process, the pressure range 48 is influenced by various factors, for example by the spreading quantity of the plant protection product, which quantity in turn depends on the driving speed of the distribution apparatus, among other things. This means that it is necessary to change the spreading quantity of the plant protection product when the driving speed is changed, and this in turn leads to a change of the spray pressure 48.

Again, a further parameter determines the height control 50 or the working distance that the distribution apparatus 26 has to the plant growth 32 during the spreading process. This height control is variably adjusted with an adjustment element 22, which is arranged between the frame 16 of the carrier vehicle 14 and the distribution apparatus 26 (as seen in FIG. 1). Diverse actuators can be used as adjustment elements 22 for the height control of the distribution apparatus 26. Preferably, hydraulically operating cylinders can be used for this purpose. Pneumatic, electric, or other actuators, however, can also be expediently employed.

By varying these preferably three mentioned parameters 44, various different spray profiles 36 for spreading the plant protection products are generated in the computer unit 20.

An automated activation of the distribution apparatus 26 could be carried out according to the present invention in the manner described as follows. First, different nozzle profiles 46 are stored in a computer unit 20, that is to say, it is defined whether, for example, one or more spray nozzles 30 that are spaced apart, for example, 25 cm or 50 cm, are activated together.

Each nozzle profile 46 is associated with a pressure range 48 as well as with a height control 50 of the distribution apparatus 26, that is to say, it is defined with which spray pressure 48 the specific nozzle profiles 46 may be charged, and also at which distance or at which height above the plant growth or above the ground surface the distribution apparatus 26 is to be guided.

In the beginning of the spreading process, for example, an operator or a vehicle driver can select from the multitude of spray profiles 36 those by way of which can be achieved the distribution precision that is required for the specific plant protection product to be spread. It is, however, also conceivable that an automatic preselection of the spray profiles 36 is carried out by the computer unit 20 by inputting the plant protection product to be spread into the computer unit 20, for example.

The start of the spreading process is subsequently carried out, and for this purpose a first spray profile 36 with its associated nozzle profile 46 as well as with its associated spray pressure 48 and with its height control 50 is selected or the distribution apparatus 26 is correspondingly activated.

If the driving speed, for example, is increased or reduced, thereby likewise increasing or reducing the spreading quantity and possibly exceeding or falling below the specified spray pressure 48, respectively, this can imply that the desired wetting can no longer be achieved and a different spray profile 36 would be necessary in order to achieve it. In this case, the computer unit 20 carries out an automated activation of another, normally previously selected spray profile 36 by way of which the desired distribution precision can be achieved, at least to the greatest possible extent, with the parameters currently existing at the distribution apparatus, for which spray profile 36, however, the parameters 44 are defined differently. This means that another nozzle profile 46 or another height control 50 is activated in the distribution apparatus 26 such that the desired wetting is likewise achieved by way of a greater or smaller spray pressure 48.

In order to determine the parameters 44 existing at the distribution apparatus 26 during the spreading process, various sensors 52 or various measuring means are located at the distribution apparatus 26 or at the field sprayer 12. Among other things, the height control 50, the spray pressure 48, the driving speed, or the spreading quantity can be determined by way of these sensors or measuring means. In an actual-target value comparison, these values are subsequently compared to those values stored in the computer unit 20 that are required for the respective spray profile 36. If there are any corresponding deviations, the distribution apparatus 26 is then in turn rerouted according to the invention to another spray profile 36.

FIG. 3 shows a top view of an exemplary embodiment of a section of the distribution apparatus 26 with nozzle holders 28, 28' or with spray nozzles 30 arranged thereon. A total of four nozzle holders are illustrated in this context. Two quadruple nozzle holders 28 and one double nozzle holder 28', which are each mounted to be spaced apart by the space a1 or a2, are illustrated in each case here. The spaces in this context are generally 50 cm for a1 and 25 cm for a2, but it is also conceivable to select these spaces to be different. The spray nozzles are each numbered from 1 to 6. One selection of nozzle combinations can then combine, for example, the spray nozzles 1+5 or the spray nozzles 4+6, etc., or only the spray nozzles 1 can be activated, and these nozzle profiles 46 can be user-defined according the desired distribution precision and be stored in the computer unit 20. Moreover, a pressure range 48 and/or a height control 50 can be associated with each nozzle profile 46 so that many different spray profiles 36 can be defined by an operator, for example.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. An agricultural distribution machine for spreading liquid or solid plant protection products by means of a distribution apparatus, which is height-adjustably arranged on a frame of the distribution machine and which is equipped with a plurality of nozzle holders which are spaced apart from each other, wherein each of the nozzle holders has at least one spray nozzle for distributing the plant protection product to be spread, wherein activation of the distribution apparatus or a distribution of the plant protection products is carried out based on at least first and second spray profiles that are stored in a computer unit, wherein each of the at least first and second spray profiles are composed of at least a nozzle profile or an associated pressure range or an associated height control, wherein each spray profile takes into account at least two parameters or sensor values, and wherein, in the instance of a deviation of at least one parameter or of one sensor value of the first spray profile, an automated activation of the distribution apparatus is carried out based on the at least two parameters of the second spray profile.

2. The agricultural distribution machine as recited in claim 1, wherein the nozzle profile is composed of an activation of spray nozzles with different characteristics or of an activation of spray nozzles that are differently spaced apart from each other.

3. The agricultural distribution machine as recited in claim 1, wherein the at least first and second spray profiles are stored in a computer unit, and the computer unit determines which of the at least first and second spray profiles is currently being used at the distribution apparatus based on the difference between an actual pressure range and a target pressure range, and the computer unit carries out an automated activation to another of the at least first and second spray profiles and its corresponding nozzle profile or its height control such that the actual pressure range approximately corresponds to the target pressure range.

4. The agricultural distribution machine as recited in claim 3, in which sensors for detecting the actual values of the at least two parameters are mounted at the distribution apparatus or at the distribution machine, wherein actual values of the at least two parameters are compared to target values of the at least two parameters of the selected spray profile by means of the computer unit.

5. The agricultural distribution machine as recited in claim 3, in which switching intensities between the at least two parameters of the spray profiles are stored in the computer unit.

6. The agricultural distribution machine as recited in claim 3, in which a strategy is stored in the computer unit, wherein the strategy limits regulation-induced pressure fluctuations or volume fluctuations during a switching point between the spray profiles.

7. The agricultural distribution machine as recited in claim 1, wherein the at least first and second spray profiles are defined such that their corresponding at least two parameters are variable across the working width of the distribution apparatus.

8. The agricultural distribution machine as recited in claim 1, wherein the at least two parameters of the at least first and second spray profiles are adaptable when driving along curves based on values determined by one or more speed sensors, wherein the one or more speed sensors are associated with the distribution apparatus or with its distribution boom.

9. The agricultural distribution machine as recited in claim 1, wherein the at least two parameters of the at least first and second spray profiles are adaptable when driving along curves based on values determined by one or more gyroscopes, wherein the one or more gyroscopes are associated with the distribution apparatus or with its distribution boom or with a towing vehicle.

10. A method for spreading liquid or solid plant protection products by means of a distribution apparatus, which is height-adjustably arranged on a frame of a distribution machine and which is equipped with a plurality of nozzle holders which are spaced apart from each other, wherein each of the nozzle holders has at least one spray nozzle for distributing the plant protection product to be spread, the method comprising:
activating the distribution apparatus or a distribution of the plant protection products based on at least first and second spray profiles stored in a computer unit, wherein each of the at least first and second spray profiles are composed of at least a nozzle profile or an associated pressure range or an associated height control;
taking into account, by the at least first and second spray profiles, at least two parameters or sensor values; and
automatically activating, upon a deviation of at least on of the at least two parameters or of one sensor value of the first spray profile, the distribution apparatus based on the at least two parameters of the second spray profile.

11. The method as recited in claim 10 wherein each of the at least first and second spray profiles are selected or configured such that by using different at least two parameters a largely same distribution quality is achieved with the spray profiles.

12. The method as recited in claim 10, in which each of the at least first and second nozzle profiles are composed of an activation of spray nozzles with different characteristics or of an activation of spray nozzles that are differently spaced apart from each other.

13. The method as recited in claim 10, wherein each of the at least first and second spray profiles are stored in the computer unit, and the computer unit determines which of the at least first and second spray profiles is currently being used at the distribution apparatus based on the difference between an actual pressure range and a target pressure range, and the computer unit carries out an automated activation to another of the at least first and second spray profiles and its corresponding nozzle profile or its height control such that the actual pressure range approximately corresponds to the target pressure range.

14. The method as recited in claim 10, wherein the computer unit carries out an automated activation of the distribution apparatus to at least one of the at least first and second spray profiles such that the at least two parameters come closest to the parameters actually existing at the distribution apparatus and such that a desired distribution quality is achieved by means of the at least two parameters, wherein an actual-target value comparison is carried out for this purpose in the computer unit.

15. The method as recited in claim 10, wherein a pressure range is influenced by the driving speed or by the spreading quantity of the plant protection product.

16. The method as recited in claim 10, wherein sensors for detecting the actual values of the at least two parameters are mounted at the distribution apparatus or at the distribution machine, wherein actual values of the at least two parameters are compared to the target values of the at least two parameters of a selected spray profile by means of the computer unit.

17. The method as recited in claim 10, in which a different one of the at least first and second spray profiles is selected by determining a deviation of the at least two parameters of the selected spray profile by means of the computer unit, wherein the at least two parameters of the selected spray profile are automatically adapted.

18. The method as recited in claim 10, wherein switching intensities between the at least two parameters of the at least first and second spray profiles are stored in the computer unit.

19. The method as recited claim 10, wherein each of the at least first and second spray profiles are activated or varied based on small-scale heterogeneities, which are determined by means of information technology and device control technology.

20. The method as recited claim 10, wherein a strategy is stored in the computer unit, wherein the strategy limits regulation-induced pressure fluctuations or volume fluctuations during a switching point between the at least first and second spray profiles.

21. The method as recited in claim 10, wherein the at least two parameters of the spray profiles are definable by an operator or accessible from a database.

22. The method as recited claim 10, wherein the at least first and second spray profiles are defined such that their corresponding at least two parameters can vary across the working width of the distribution apparatus.

23. The method as recited in claim 10, wherein the at least two parameters of each of the at least first and second spray profiles are adapted when driving along curves based on values determined by at least one speed sensor, wherein the at least one speed sensor is associated with the distribution apparatus or with its distribution boom.

24. The method as recited in claim 10, wherein the at least two parameters of each of the at least first and second spray profiles are adapted when driving along curves based on values determined by at least one gyroscope wherein the at least one gyroscope is associated with the distribution apparatus or with its distribution boom or with a towing vehicle.

* * * * *

UNITED STATES PATENT AND TRADEMARK OFFICE
CERTIFICATE OF CORRECTION

| | | |
|---|---|---|
| PATENT NO. | : 10,238,098 B2 | Page 1 of 1 |
| APPLICATION NO. | : 15/505222 | |
| DATED | : March 26, 2019 | |
| INVENTOR(S) | : Theodor Leeb | |

It is certified that error appears in the above-identified patent and that said Letters Patent is hereby corrected as shown below:

On the Title Page

At item (73), delete "HORSCG LEEB Application Systems GmbH" and substitute --HORSCH LEEB Application Systems GmbH--.

Signed and Sealed this
Sixth Day of August, 2019

Andrei Iancu
*Director of the United States Patent and Trademark Office*